July 14, 1931.  Z. C. BRADFORD  1,814,237
ELECTRIC MOTOR
Filed April 5, 1929  2 Sheets-Sheet 1

Inventor
Zerbe C. Bradford
By Spencer, Hardman and Fehr
His Attorneys

July 14, 1931.   Z. C. BRADFORD   1,814,237
ELECTRIC MOTOR
Filed April 5, 1929   2 Sheets-Sheet 2

Inventor
Zerbe C. Bradford
By Spencer, Hardman & Fehr
His Attorneys

Patented July 14, 1931

1,814,237

UNITED STATES PATENT OFFICE

ZERBE C. BRADFORD, OF DAYTON, OHIO, ASSIGNOR TO DELCO PRODUCTS CORPORATION, OF DAYTON, OHIO, A CORPORATION OF DELAWARE

ELECTRIC MOTOR

Application filed April 5, 1929. Serial No. 352,847.

This invention relates to an electric motor, and in particular to an electric motor having a shaft rotatably mounted concentric with and through the armature core. For small motors, and especially motor starting and stopping frequently it is very important to have a very small load while starting. If the load is increased a heavier current will be utilized by the motor. This may not have any serious objections if the motor is not connected in the same circuit as are electric lights. When the motor is used in the light circuit, as is often times the case in electrical refrigerators, it is very desirable to reduce the starting current of the motor as much as possible.

An object of this invention is to reduce the starting load on the motor by eliminating the drag or the binding effect caused by the tension of the drive belt mounted upon a pulley on the armature shaft. This is accomplished by mounting the armature core on tubular trunnions journalled in bearings mounted in the motor frame, passing a freely rotatable shaft through the armature core and through the trunnions, and journalling the shaft in bearings mounted in the frame of the motor. When a centrifugal clutch used to connect the armature to the shaft is disengaged, the pull upon the armature shaft due to the tension of the belt does not add to the load on the armature.

Another object is to reduce the noises due to the engagement and the disengagement of the centrifugal clutch used to connect the armature to the shaft. This has been accomplished by mounting the clutch within a housing formed by one of the trunnions and part of the armature. By completely enclosing the clutch the noise produced by the operation of the centrifugal clutch is greatly reduced.

Another object is to reduce the number of parts required to construct the motor. This has been accomplished by using the armature conductors as rivets to attach the trunnion and the clutch housing to the armature. By so doing the resistance rings used on squirrel cage motors are also eliminated as the trunnion and the clutch housing take the place of these.

Another object is to reduce the rotor vibration. This has been accomplished by providing a more rigid support for the armature core by mounting it upon tubular trunnions journalled in the frame. Within reasonable limits it is a well known fact from mechanics of materials that a tubular support provides a more rigid support than does a solid shaft having the same mass of material. This principle has been utilized in the manufacture of this motor. By reducing the vibration of the motor, the magnetic hum is decreased.

Further objects and advantages of the present invention will be apparent from the following description, reference being had to the accompanying drawings, wherein a preferred form of the embodiment of the present invention is clearly shown.

Figure 1:
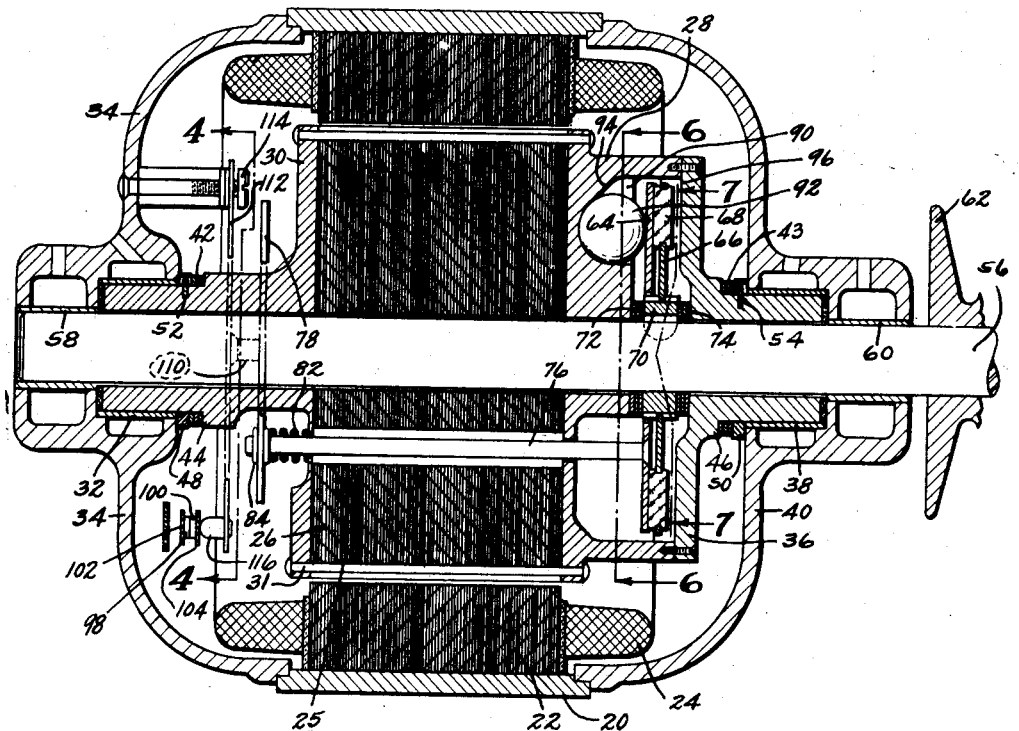
Fig. 1 is a longitudinal sectional view of the motor.

The electric motor comprises a stator including a frame; a rotor including an armature core, a pair of trunnions journalled in bearings mounted in the frame and a clutch housing mounted intermediate the armature core and one of the trunnions; a freely rotatable shaft concentric with and passing through the rotor, the shaft being journalled in bearings mounted in the frame; a centrifugal clutch for connecting the motor to the shaft when the rotor has obtained a predetermined speed; and a switch mechanism to control the electric circuit of the motor so as to disconnect the stator starter winding simultaneously with the connecting of the shaft to the rotor by the centrifugal clutch.

In the drawings the reference character 20 indicates a field frame carrying a stator pole piece 22 and stator windings 24.

The rotor 25 includes an armature core 26 attached to a clutch housing member 28 and a tubular trunnion 30 journalled in the bearing 32 carried by the end frame 34. By properly selecting the material in the designing of the clutch housing 28 and the trunnion 30, these will have a suitable resistance so that the armature conductor 31 may be riveted to each of these. Attached to the clutch housing 28 is a trunnion 36 journalled in bearing 38 and carried by the end frame 40. Endwise movement of the rotor is prevented by the spring washers 42 and 43 mounted intermediate the shoulders 44 and 46, integral with the trunnions 30 and 36 respectively, and the collars 48 and 50 which abut the end frames 34 and 40 respectively. In order to reduce the noise produced by the spring washer rotating at various rates of speed, some possible rotating at the same rate of speed as the rotor and others standing still or practically so, the collars 48 and 50 have been provided with slots which cooperate with the keys 52 and 54 carried by the trunnions 30 and 36, respectively, to rotate the collars 48 and 50 with the rotor, which will cause all of the spring washers to rotate at the same speed as the rotor, thereby eliminating the chattering noise caused by the washers rotating at different speeds.

A shaft 56 is journalled in the bearings 58 and 60 carried by the end frames 34 and 40 respectively, the bearings 58 and 60 being arranged in stepped relation with respect to the bearings 32 and 38 respectively. The shaft 56 is freely rotatable so that the rotor may rotate without rotating the shaft 56 or vice versa. From this it may readily be seen that when the shaft 56 is disconnected from the rotor any tension caused by the belt carried by a pulley 62 will not have a tendency to bind the rotor, thereby decreasing the starting torque to the minimum required to start the rotor from stand still to a predetermined speed at which a clutch will connect the rotor to the shaft 56. By reducing the starting torque by eliminating the binding effect a smaller current is required in starting the rotor, hence the starting of the rotor will have less effect upon other loads in the same circuit, as for example an electric light.

Figure 2:
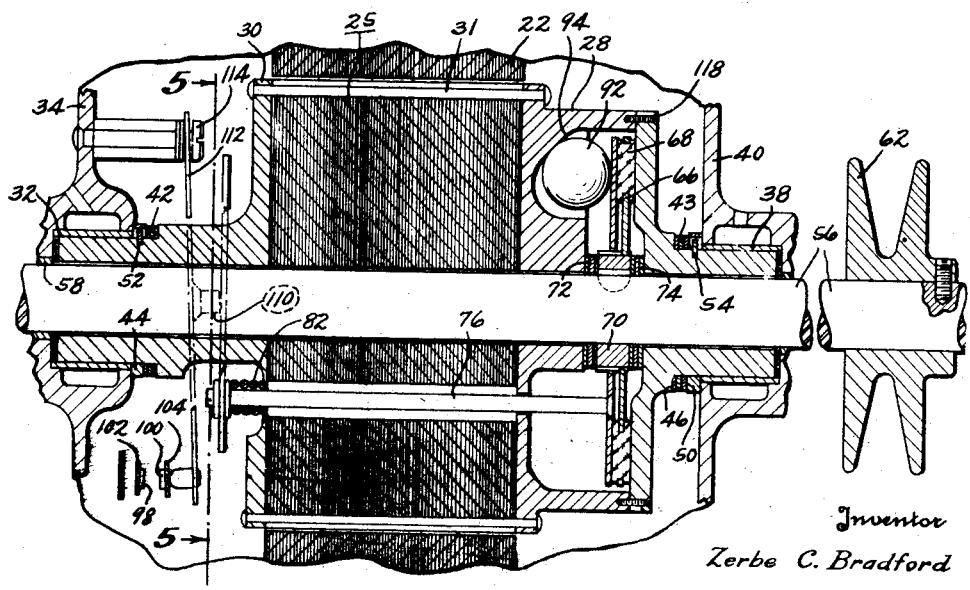
Fig. 2 is a view similar to Fig. 1 showing the clutch engaged and the electric switch open.

A suitable clutch mounted in the clutch housing 28 for connecting the rotor to the shaft 56 comprises a floating driving clutch plate 64, a driven clutch plate 66 carrying friction inserts 68 and splined to a collar 70 keyed to the shaft 56. Endwise movement of the shaft 56 is prevented by spring washers 72 and 74, placed between the collar 70 and the housing 28 and between the collar 70 and the trunnion 36, respectively. The floating clutch plate 64 is attached to the rotor by means of three bolts or rods 76 passing through suitable apertures in the rotor and engaging a plate 78 having an aperture 80 for receiving the tubular portion of the trunnion 30. Springs 82 are placed intermediate the plate 78 and the trunnion 30. Spring clips 84 are used to attach the rods 76 to the plate 78. The plates 64 and 78 are always biased by the springs 82 to the left as viewed in Figs. 1 and 2 for a reason that will appear more clearly later.

The clutch housing 28 has three radially extending channels or pockets 90 into which are mounted centrifugal weights or balls 92, said balls moving outwardly or radially with a force which is a function of the angular velocity of the rotor. These balls not only move radially but also laterally because of the inclined wall 94 of the housing 28, whereby when the balls 92 are forced radially they exert force upon the plate 64 forcing the driven plate 66 into engagement with the inner surface 96 of the trunnion 36. It will be readily seen that when the centrifugal force exerted by the balls 92 attains a magnitude sufficient to overcome the force of the springs 82 the clutch will engage so as to rotate the shaft 56 with the rotor.

Figure 3:
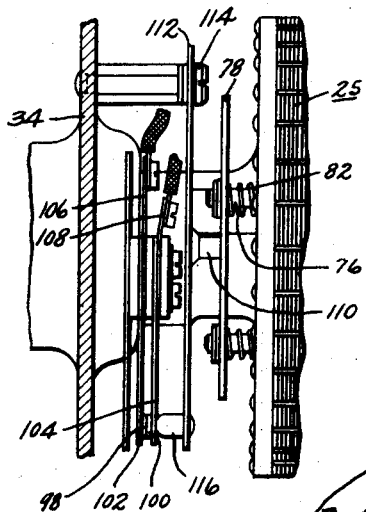
Fig. 3 is a sectional view of the switch on the line 3—3 of Fig. 4.
Figure 5:
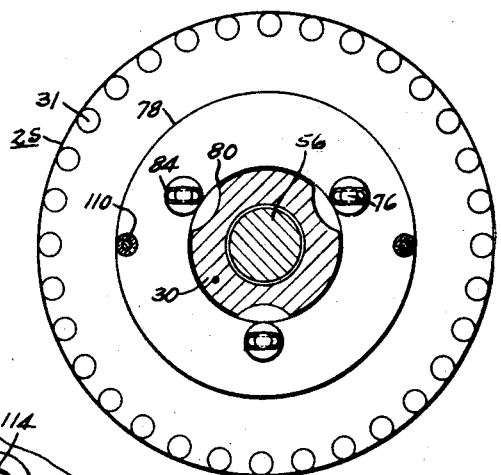
Fig. 5 is a fragmentary sectional view taken on the line 5—5 of Fig. 2.
Figure 4:
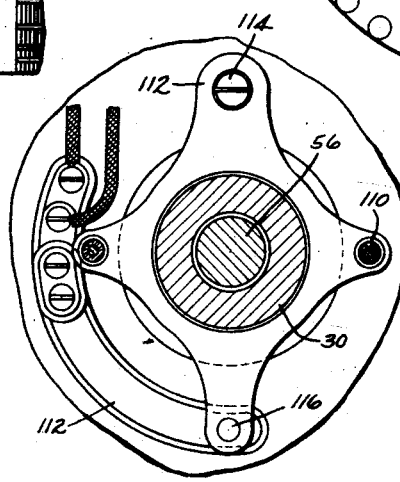
Fig. 4 is a sectional view of the switch taken on the line 4—4 of Fig. 1.
Figure 6:
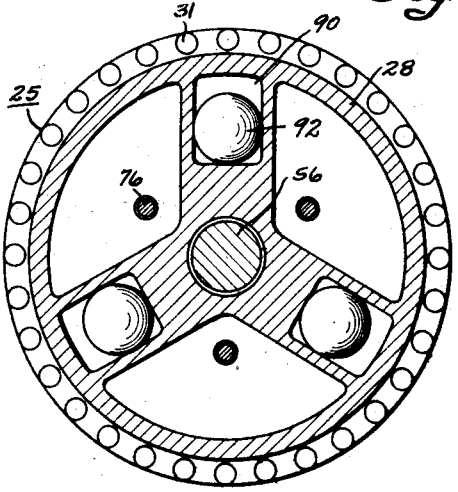
Fig. 6 is a sectional view of the clutch taken on the line 6—6 of Fig. 1.
Figure 7:
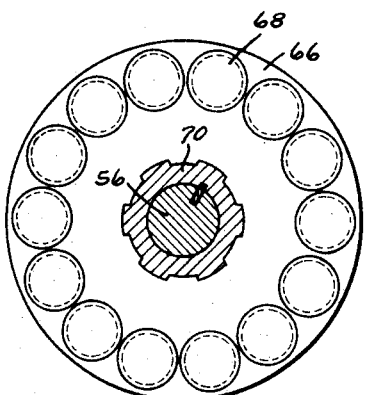
Fig. 7 is a sectional view of the clutch taken on the line 7—7 of Fig. 1.

The centrifugal means for controlling the clutch operates also to control the electric circuit for the motor, which will now be described. The motor is provided with a starting circuit which is normally closed by a pair of switch contacts 98 and 100, carried by leaf spring conductors 102 and 104 respectively, connected with terminal plates 106 and 108. These parts are insulatingly supported by the end frame 34 with the parts 102 and 104 in the electric contact with the parts 106 and 108 as shown in Fig. 3. The leaf spring 104 is normally biased so as to maintain the contact 100 separated from the contact 98. When the motor is at rest the contact 100 is held in engagement with the contact 98 due to the action of the springs 82 which press the plate 78 against two projections 110 extending from a plate 112 which is pivoted upon a screw 114 so as to swing with respect to the motor end frame 34. The plate 112 is provided with a central aperture for receiving the tubular portions of the trunnion 30 which prevents the plate 112 from rotating about the screw 114. The free end of the plate 112 carries a stud 116 which bears against the spring conductor 104 and maintains contact 100 in engagement with the contact 98. When the balls 92 pull outwardly to engage the clutch member, the plate 78 is moved toward the right from the position shown in Fig. 1 to that shown in Fig. 2 in order to permit the plate 112 to swing away from the motor frame 34 and to permit the spring conductor 104 to separate the contacts 98 and 100.

The motor structure will be readily dissembled by removing the end frame 40 and by removing the screws 118 so as to permit the removal of the trunnion 36 from the clutch housing 28. When this has been done it may be readily seen that the shaft 56 carrying the collar 70 and the plate 66 may be removed from the rotor 25 and the rotor may be moved endwise out of the motor frame. The switch may now be dissembled by removing the screw 114 and the screws 118.

While the form of embodiment of the present invention as herein disclosed, constitutes a preferred form, it is to be understood that other forms might be adopted, all coming within the scope of the claims which follow.

What is claimed is as follows:

1. An electric motor comprising, in combination, a stator including a frame; a rotor including an armature core and a pair of tubular trunnions attached to the core, said trunnions being journalled in bearings mounted in the frame; a freely rotatable shaft passing through the armature core and coaxially mounted with respect to said tubular trunnions; and a clutch for connecting said rotor to said shaft when a predetermined speed of the rotor has been attained, said clutch including coaxially rotatable driving and driven members, said driving member being fixed to the armature core, a clutch floating plate carried by the driving member, said plate being axially movable, a driven plate located between the floating plate and one of the trunnions and connected with the driven member, said driven plate being axially movable relative to the driven member, and centrifugal means for causing the driven plate to be gripped between said floating plate and said trunnion and including weights carried by the driving member and guided thereby for lateral and oblique movement relative to its axis, said weights directly engaging the floating plate.

2. An electric motor comprising, in combination, a stator including a frame; a rotor including an armature core and a pair of tubular trunnions attached to the core, said trunnions being journalled in the frame; a freely rotatable shaft passing through the armature core and coaxially mounted with respect to said trunnions; and a clutch for connecting said rotor to said shaft, said clutch including speed responsive means causing the clutch to be engaged, so as to connect the rotor to the shaft when the rotor has attained a predetermined speed.

3. An electric motor comprising, in combination, a stator including a frame, a rotor including an armature core and a pair of trunnions attached to the core, said trunnions being journalled in bearings carried by the frame, a shaft passing through the armature core and journalled in the frame so that the shaft will not retard the movement of the armature while starting; and a centrifugal clutch for connecting said rotor to said shaft when a predetermined speed has been attained by the rotor.

4. An electric motor comprising, in combination, a stator including a frame; a pair of bearings carried by the frame; a rotor including an armature core and a pair of tubular trunnions attached to said core for rotatably supporting the core, said trunnions being journalled in said pair of bearings; a second pair of bearings abutting said trunnions carried by the frame; a shaft passing through the trunnions and the core journalled in said second pair of bearings; and means for connecting said rotor to said shaft whereby the shaft is rotated with the rotor.

5. An electric motor comprising, in combination, a stator including a frame; a pair of bearings carried by the frame; a rotor including an armature core and a pair of trunnions, said trunnions being journalled in said bearings; means for reducing end movement of the rotor, said means including a collar splined to one of the tubular trunnions and abutting the motor frame, resilient means mounted intermediate the collar and a shoulder on the trunnion to bias the trunnion away from the end frame, the splined collar rotating with the rotor so as to run quietly.

In testimony whereof I hereto affix my signature.

ZERBE C. BRADFORD.